United States Patent [19]

Jimenez et al.

[11] Patent Number: 4,934,294
[45] Date of Patent: Jun. 19, 1990

[54] INFORMATION DEVICE FOR AN ELECTRONIC SEWING MACHINE

[75] Inventors: Antonio Jimenez, Meyrin; Pierre-Alain Deschenaux, Coinsins, both of Switzerland

[73] Assignee: Mefina SA, Fribourg, Switzerland

[21] Appl. No.: 349,750

[22] Filed: May 9, 1989

[30] Foreign Application Priority Data

May 9, 1988 [CH] Switzerland .......................... 1756/88

[51] Int. Cl.⁵ ............................................. D05B 3/02
[52] U.S. Cl. .................................................. 112/445
[58] Field of Search .............. 112/445, 444, 458, 453, 112/454, 121.11, 121.12, 258

[56] References Cited

U.S. PATENT DOCUMENTS

| | | | |
|---|---|---|---|
| 4,079,683 | 3/1978 | Hanyu et al. | 112/444 |
| 4,335,667 | 6/1982 | Beckerman et al. | 112/445 |
| 4,343,248 | 8/1982 | Hanyu et al. | 112/445 |
| 4,365,566 | 12/1982 | Laidig | 112/444 |
| 4,620,496 | 11/1986 | Hanyu | 112/445 |
| 4,677,924 | 7/1987 | Diener et al. | 112/444 |

Primary Examiner—Peter Nerbun
Attorney, Agent, or Firm—Cushman, Darby & Cushman

[57] ABSTRACT

An information device for an electronic sewing machine includes a substrate carrying two rows of ideograms representative of some of the sewing patterns capable of being carried out by the sewing machine, and a flap hinged between these rows and carrying, on each face, a row of ideograms concerning others of these sewing patterns. The flap is pivotable into two end positions, for covering up one or the other row of ideograms of the substrate. The flap has, for each ideogram, a window allowing viewing of a diode associated with each ideogram of the substrate. Keys allow selection of each desired sewing pattern whose identity is signalled by the lighting-up of the diode associated with the corresponding ideogram, or the diode visible through the window of the flap adjacent to that ideogram.

6 Claims, 2 Drawing Sheets

FIG. 1
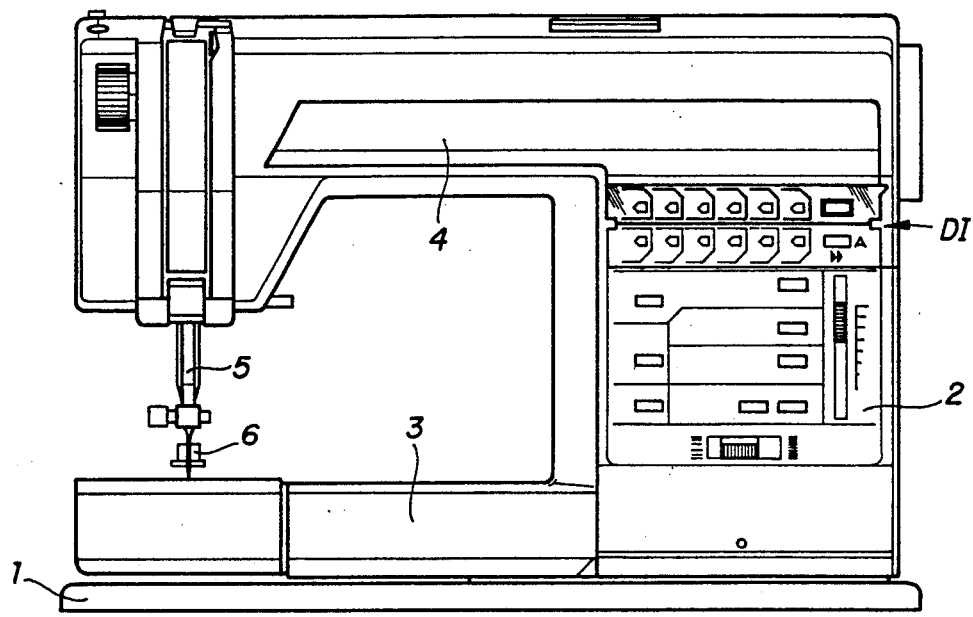
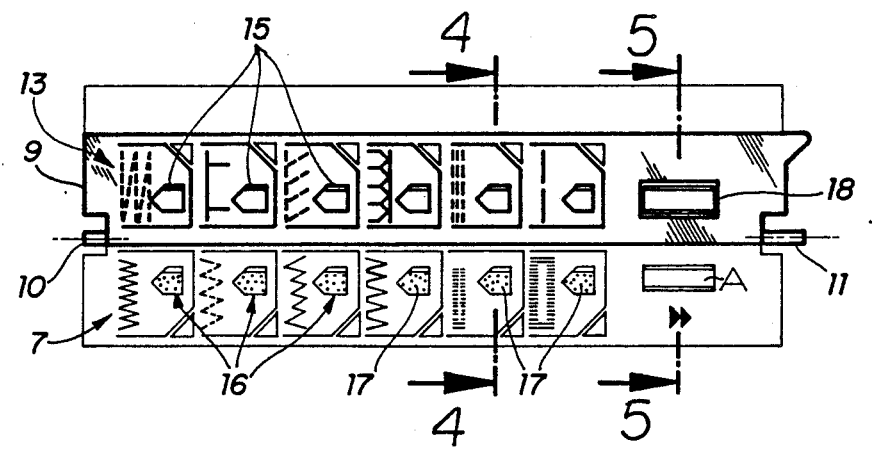
FIG. 2

INFORMATION DEVICE FOR AN ELECTRONIC SEWING MACHINE

BACKGROUND OF THE INVENTION

1. Field of the Invention and Description of the Prior Art

The present invention is directed to an information device for an electronic sewing machine. In particular, it is provided on a machine for allowing the carrying out of a plurality of different sewing patterns from instructions stored in a memory, of the type described in U.S. Pat. Nos. 4,323,023 and 4,335,667. The invention comprises on the one hand, a substrate carrying at least a first set of indications characteristic of at least a series amongst the sewing patterns of said plurality of sewing patterns, and on the other hand, a pivoting flap connected to the substrate and being capable of being folded back onto the substrate at two angular end positions. The flap will mask a different portion of the substrate at each of said end angular positions, the two faces of the flap carrying at least a second set of indications replacing alternatively, for the user, those carried by the portion of the substrate masked by the flap, in one or the other of its end positions. The invention further comprises a plurality of visual indicating elements, capable of being brought alternately into an active state and into a passive state of operation, each element being associated with a specific indication characteristic of a predetermined sewing pattern.

BRIEF SUMMARY OF THE INVENTION

The device according to the present invention is characterized by the fact that said first set of indications carried by the substrate is formed by at least two rows of ideograms, each one characteristic of a sewing pattern of said series of sewing patterns, that the flap is hinged between these rows, that said second set of indications is formed by at least two other rows of ideograms representative of other sewing patterns capable of being carried out by the sewing machine, one of these rows being carried by the first face of the flap and the other by the second face of the flap, that the ideograms of each face of the flap are positioned in such a way that in the one and in the other of said end positions, these ideograms are situated substantially in line with the ideograms carried by the portion of the substrate covered up by the flap, that the flap has a window associated with each ideogram, that the visual indicating elements correspond, in number, to the number of ideograms carried by the substrate, and that they are disposed on this in such a manner as to remain visible through the windows of the flap, in a folded-over position of the flap, in such a manner as to allow, in one of their operational states, the throwing into relief of as many of the ideograms visible on this substrate (i.e. to make them stand out) as those of the shutter whose windows allow viewing of the indicating elements brought into said operational state.

The invention is also directed to an electronic sewing machine incorporating such a device.

Preferably, but not exclusively, the substrate carrying the first set of ideograms is formed by at least a portion of the casing of the machine.

BRIEF DESCRIPTION OF THE DRAWINGS

The accompanying drawings represent by way of example an embodiment of the subject of the present invention.

FIG. 1 is a view in elevation of a sewing machine equipped with a device according to the invention;

FIG. 2 is a detail view of FIG. 1, on a larger scale;

DETAILED DESCRIPTION OF THE DRAWINGS

Figure 3:
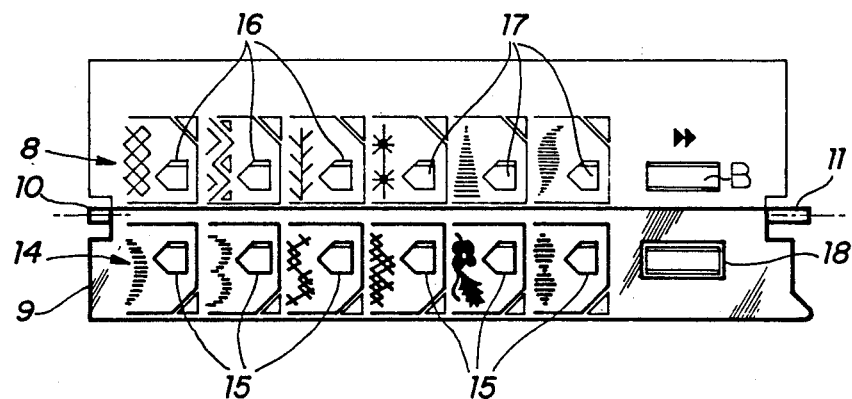
FIG. 3 is a view similar to that of FIG. 2, with certain elements in another position.

The sewing machine shown in FIG. 1, of the type known as "free arm", comprises a base 1 on the right-hand part of which there stands a vertical pillar 2 carrying two horizontal arms, 3 and 4 respectively. The first horizontal arm 3, incorporates in particular, a cloth feed device, a loop pick-up device, and a drive and control mechanism, none of which are shown. The second horizontal arm 4 carries a needle bar 5, a drive mechanism, not shown, for this bar, and a pressure foot 6.

This sewing machine is an electronic machine of the microprocessor type, that is to say, a machine in which the instructions necessary for control of the needle, of the feed device for the cloth to be sewn, and of the loop pick-up device, for example, with a view to obtaining different sewing patterns, are stored in digital form in one or more electronic memories, ROM, PROM, RAM etc. The instructions are read by a microprocessor on which the control of all of the functions of the machine depends.

These instructions may, in particular, relate to the carrying out of different types of sewing patterns, which the user may pre-select individually with a view to their being subsequently carried out by the action of various keys comprised in the machine shown. The instructions indicated by the references A and B (FIGS. 2 and 3) are more directly concerned with the information device according to the invention, as indicated in the drawings by the reference DI (FIG. 1) and which is now described.

Figure 4:
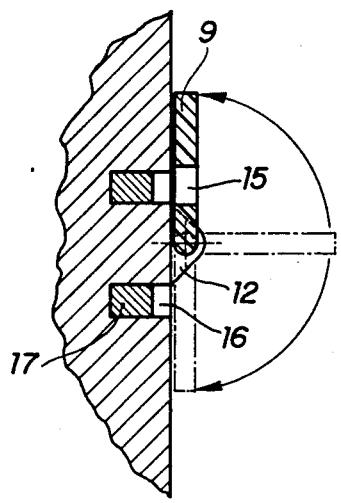
FIGS. 4 and 5 are sectional views of FIG. 2 on the lines 4—4, 5—5 respectively.
Figure 5:
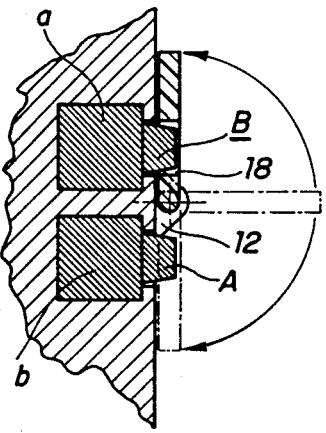

This device comprises, disposed on the upper part of the pillar 2 of the machine, two parallel and adjacent rows, 7 and 8, (FIGS. 2 and 3), of six ideograms, each representing as many different types of sewing patterns as are capable of being carried out by the sewing machine. Between these rows, there is mounted a flap 9, at the two extremities of which there project pins 10 and 11, each pivoted in an individual lug 12 extending from the front face of the pillar 2 (FIGS. 4 and 5). Flap 9 may thus be moved by pivoting action into one or other of two end positions in which it covers up either the ideograms of the row 8 (FIG. 2), or those of the row 7 (FIG. 3).

As may be seen in the drawings, each face of the flap 9 has a row of six ideograms 13, 14 respectively, corresponding to twelve other different types of sewing patterns. To the right of each ideogram, the flap 9 has a window 15 of polygonal shape. The ideograms of the flap are arranged in such a manner that in one or other of its two folded-over positions (FIGS. 2 and 3), each ideogram finds itself just over one of the ideograms of the row 7 or 8 which is covered up by the flap.

It is convenient, at this point, to point out that to the right of each ideogram of the rows 7 and 8, the surface of the pillar 2 is hollowed out by a recess 16 in which there is disposed a diode 17, whose function will be illustrated below. Furthermore, the placing of the recesses 16 on the pillar 2 is such that the diodes 17, associated with the one and the other row of ideograms 7 and 8, remain visible through the windows 15 of the flap 9, in the one as in the other pivoted end position of the flap 9.

It is to be pointed out again that the flap has a supplementary window 18, of slightly greater dimensions than the cross-section of the control keys A and B for switches a and b housed in recesses of the pillar 2 of the machine. The relative position of the keys A and B and of the window 18 of the flap 9 is such that this flap covers one or the other of these keys depending on the end position which it occupies.

Moreover, and as is to be clearly seen in FIG. 5, the thickness of the flap 9 and/or the height of the projecting part of the keys A and B are such that, in one or the other of the pivoted end positions of the flap, the key A or B finding itself temporarily in the window 18 of the flap remains retracted, that is to say, slightly set back with respect to the surface of the flap (see FIG. 5) such that it is impossible to activate it.

In a variant, not shown, it is obviously possible to make use of a flap of greater thickness, in which the window 18 is replaced by a recess provided in each face of the flap, the recesses being in line with one another. In such an arrangement, key A may take up a position in one recess, and key B in the other recess, depending on the pivoted end position occupied by the flap 9.

The information device which has just been described is, in effect, intended for an electronic sewing machine in which the selection of the sewing patterns is brought about, for example, according to the principles disclosed in U.S. Pat. No. 4,005,664 or in the manner put into practice more recently in the ELNA (Trade Mark) 5000 machine.

In the one in the other of these techniques, the selection of a given sewing pattern is brought about, in fact, by the simple repetitive action of a single control key. Following each activation of the control key, the movement of a pointer takes place through the electronic memory in which there is stored the information relating to the carrying out of the various sewing patterns to be, from the start of the set of information concerning a given sewing pattern to the start of the corresponding set relating to the following sewing pattern. When the pointer has been brought to the start of the portion of memory concerning the last pattern stored, a subsequent activation of the control key brings the pointer back to the start of the portion of memory relating to the first pattern stored in the memory, and so on; the system which has just been described thus works in a closed loop.

It is to be again pointed out that each time the pointer is brought to the start of the section of memory for a given sew pattern, the system causes the lighting up of the diode associated with the corresponding ideogram.

In the case of the machine shown in FIG. 1, the repeated activation of the key A determines the successive selection of all the sewing patterns whose ideograms are visible in FIG. 2, starting with that occupying the extreme right position in row 13 and going from there in an anticlockwise direction.

The key B allows the obtaining of the selection of the sewing patterns whose ideograms appear in FIG. 3, from the ideogram situated at the extreme right of the row 8 of ideograms, going through the rows 8 and 9 in the anticlockwise direction.

The invention is not limited to that which has been shown: in particular, it is obvious that the information device described need not be associated with the casing itself of a sewing machine, but may be a part, for example, of a control box independent of the machine, such as is often found with sewing machines of industrial type, for example.

We claim:

1. An information device for an electronic sewing machine which allows the carrying out of a plurality of different sewing patterns from instructions stored in an electronic memory, said information device comprising:

a substrate carrying at least a first set of indications characteristic of sewing patterns from a series of said plurality of sewing patterns;

a pivoting flap connected to said substrate and being capable of being folded back thereon into two end positions, said flap masking a different portion of said substrate in each of said two end positions, the two faces of said flap carrying at least a second set of indications replacing alternatively those carried by the portion of said substrate masked by said flap in one or the other of said two end positions; and a plurality of visual indicating elements, capable of being brought alternately into an active state or into a passive state of operation, each visual indicating element being associated with a specific indication characteristic of a predetermined sewing pattern;

said first set of indications carried by said substrate being formed by at least two rows of ideograms, each one characteristic of a sewing pattern of said series of sewing patterns, said flap being hinged between said at least two rows, said second set of indications being formed by at least two other rows of ideograms representative of other sewing patterns capable of being carried out by the sewing machine, one of these rows being carried by the first face of said flap and the other by the second face of said flap, the ideograms of either face of said flap being situated substantially in line with the ideograms carried by the portion of the substrate covered by said flap;

said flap having a window associated with each ideogram, said plurality of visual indicating elements corresponding in number to the number of ideograms carried by said substrate and being arranged on said substrate so as to remain visible through the windows of said flap when said flap covers a portion of said substrate;

wherein selection of a sewing pattern results in activation of the visual indicating element which corresponds to an ideogram depicting the selected sewing pattern and said corresponding visual indicating element indicates its activation through the corresponding window in said flap when the selected sewing pattern is carried by said flap.

2. A device as in claim 1, said plurality of visual indicating elements comprising light emitting diodes.

3. A device as in claim 1, said pivoting flap preventing activation of the visual indicating elements which correspond to sewing patterns carried on the portion of substrate covered by the flap and on the face of the flap which abuts against the portion of substrate covered by the flap.

4. An electronic sewing machine incorporating an information device, in particular for a machine allowing the carrying out of a plurality of different sewing patterns from instructions stored in an electronic memory, comprising:
- a substrate carrying at least a first set of indications characteristic of a series of sewing patterns from said plurality of sewing patterns;
- a pivoting flap connected to said substrate and being capable of being folded back thereon into two end positions, said flap masking a different portion of said substrate in each of said two end positions, the two faces of said flap carrying at least a second set of indications replacing alternatively those carried by the position of said substrate masked by said flap in one or the other of said two end positions; and
- a plurality of visual indicating elements, capable of being brought alternately into an active state or into a passive state of operation, each visual indicating element being associated with a specific indication characteristic of a predetermined sewing pattern;
- said substrate carrying the first set of ideograms being formed by at least a portion of a casing of the machine, said first set of indications carried by said substrate being formed by at least two rows of ideograms, each one characteristic of a sewing pattern of said series of sewing patterns, said flap being hinged between said at least two rows, said second set of indications being formed by at least two other rows of ideograms representative of other sewing patterns capable of being carried out by the sewing machine, one of these rows being carried by the first face of said flap and the other by the second face of said flap, the ideograms of either face of said flap being situated substantially in line with the ideograms carried by the portion of the substrate covered up by said flap;
- said flap having a window associated with each ideogram, said plurality of visual indicating elements corresponding in number to the number of ideograms carried by said substrate and being arranged on said substrate so as to remain visible through the windows of said flap when said flap covers a portion of said substrate;
- wherein selection of a sewing pattern results in activation of the visual indicating element which corresponds to an ideogram depicting the selected sewing pattern and said corresponding visual indicating element indicates its activation through the corresponding window in said flap when the selected sewing pattern is carried by said flap.

5. A machine as in claim 4, said plurality of visual indicating elements comprising light emitting diodes.

6. A machine as in claim 4, said pivoting flap preventing activation of the visual indicating elements which correspond to sewing patterns carried on the portion of substrate covered by the flap and on the face of the flap which abuts against the portion of substrate covered by the flap.

* * * * *